(12) United States Patent
Park et al.

(10) Patent No.: US 12,150,152 B2
(45) Date of Patent: Nov. 19, 2024

(54) METHOD AND APPARATUS FOR REPEATEDLY TRANSMITTING CONTROL INFORMATION IN WIRELESS COMMUNICATION SYSTEM

(71) Applicant: Samsung Electronics Co., Ltd., Suwon-si (KR)

(72) Inventors: Sungjin Park, Suwon-si (KR);
Hyunseok Ryu, Suwon-si (KR);
Jonghyun Bang, Suwon-si (KR);
Jeongho Yeo, Suwon-si (KR);
Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 17/271,391

(22) PCT Filed: Aug. 27, 2019

(86) PCT No.: PCT/KR2019/010881
§ 371 (c)(1),
(2) Date: Feb. 25, 2021

(87) PCT Pub. No.: WO2020/045935
PCT Pub. Date: Mar. 5, 2020

(65) Prior Publication Data
US 2021/0329647 A1    Oct. 21, 2021

(30) Foreign Application Priority Data
Aug. 28, 2018 (KR) .................. 10-2018-0101585

(51) Int. Cl.
*H04W 72/53* (2023.01)
*H04L 1/00* (2006.01)
(Continued)

(52) U.S. Cl.
CPC .......... *H04W 72/53* (2023.01); *H04L 1/0038* (2013.01); *H04W 56/001* (2013.01); *H04W 72/0446* (2013.01); *H04W 72/30* (2023.01)

(58) Field of Classification Search
CPC ............. H04L 1/0038; H04W 56/001; H04W 72/0446; H04W 72/30; H04W 72/53
See application file for complete search history.

(56) References Cited

U.S. PATENT DOCUMENTS 9,860,890 B2   1/2018   You et al.
10,841,940 B2  11/2020  Yeo et al.
(Continued)

FOREIGN PATENT DOCUMENTS

| WO | 2015/093851 A1 | 6/2015 |
|----|----------------|--------|
| WO | 2018/045307 A1 | 3/2018 |
| WO | 2018/105886 A1 | 6/2018 |

OTHER PUBLICATIONS

Korean Office Action dated Jan. 19, 2023, issued in Korean Application No. 10-2018-0101585.
(Continued)

*Primary Examiner* — Brian P Cox
(74) *Attorney, Agent, or Firm* — Jefferson IP Law, LLP

(57) ABSTRACT

The disclosure relates to a method and apparatus for repeatedly transmitting control information in a wireless communication system, and in an embodiment, a method, performed by a user equipment (UE), of repeatedly transmitting control information in a wireless communication system includes receiving, from a base station (BS), a control information repetition configuration including a repetition level parameter which indicates a number of repeatedly transmitted control resource sets (CORESETs), and per-
(Continued)

forming blind decoding on the repeatedly transmitted CORESETs, based on the control information repetition configuration.

6 Claims, 10 Drawing Sheets

(51) Int. Cl.
　　*H04W 56/00*　　(2009.01)
　　*H04W 72/0446*　　(2023.01)
　　*H04W 72/30*　　(2023.01)

(56) References Cited

U.S. PATENT DOCUMENTS

| | | | |
|---|---|---|---|
| 2018/0192405 A1 | 7/2018 | Gong et al. | |
| 2018/0227777 A1 | 8/2018 | Sun et al. | |
| 2019/0020506 A1* | 1/2019 | Cheng | H04L 1/007 |
| 2021/0120557 A1* | 4/2021 | Takeda | H04W 16/28 |
| 2021/0227511 A1* | 7/2021 | Solano Arenas | H04L 5/0082 |
| 2021/0410086 A1* | 12/2021 | Davydov | H04L 27/26 |

OTHER PUBLICATIONS

European Office Action dated Mar. 22, 2023, issued in European Application No. 19855716.7.
Nokia, "On reducing the PDCCH channel estimation and BD complexity in NR," 3GPP TSG RAN WG1 Ad Hoc 1801, R1-1800550, Vancouver, Canada, Jan. 22-26, 2018.
Korean Office Action dated Jun. 14, 2023, issued in Korean Application No. 10-2018-0101585.
European Office Action dated Jul. 26, 2023, issued in European Application No. 19855716.7.
CORESET configuration and search space design', R1-1715395, 3GPP TSG RAN WG1 Meeting AH_NR#3, Sep. 11, 2017.
Blind/HARQ-less Repetition for Scheduled DL-SCH Operation', R1-1805867, 3GPP TSG RAN WG1 Meeting #93, May 11, 2018.
International Search Report dated Dec. 13, 2019, issued in International Application No. PCT/KR2019/010881.
Sony, on Layer1 enhancement for URLLC, Aug. 11, 2018, 3GPP TSG RAN WG1 Meeting #94, R1-1808343, Gothenburg, Sweden, Aug. 20-24, 2018.
European Search Report dated Sep. 28, 2021, issued in European Application No. 19855716.7.
European Office Action dated Jun. 29, 2022, issued in European Application No. 19855716.7.
Korean Rejection Decision with English translation dated Dec. 11, 2023; Korean Appln. No. 10-2018-0101585.
Korean Notice of Amendment Dismissal with English translation dated Dec. 11, 2023; Korean Appln. No. 10-2018-0101585.
Korean Office Action with English translation dated Apr. 17, 2024; Korean Appln. No. 10-2018-0101585.

* cited by examiner

METHOD AND APPARATUS FOR REPEATEDLY TRANSMITTING CONTROL INFORMATION IN WIRELESS COMMUNICATION SYSTEM

TECHNICAL FIELD

The disclosure relates to a method and apparatus for repeatedly transmitting control information in a wireless communication system.

BACKGROUND ART

To meet the ever-increasing demand with respect to wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. The 5G communication system defined by the 3rd Generation Partnership Project (3GPP) is called a new radio (NR) system. Implementation of the 5G communication system using ultrahigh frequency (millimeter wave (mmWave)) bands, e.g., 60 gigahertz (GHz) bands, is being considered to attain higher data transfer rates. To reduce propagation loss of radio waves and increase a transmission range of radio waves in the ultra-frequency bands, beamforming, massive multiple-input multiple-output (MIMO), full dimensional MIMO (FD-MIMO), array antennas, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multipoints (CoMP), reception-end interference cancellation, and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-oriented connectivity network where humans generate and consume information to an Internet of things (IoT) network where distributed entities or things send, receive, and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet technology (IT) services that create new value to human life by collecting and analyzing data generated from the things connected. IoT may be applied to a variety of areas, such as smart homes, smart buildings, smart cities, smart cars or connected cars, smart grids, health care, smart home appliances and advanced medical services through convergence and combination between existing Information Technologies (ITs) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies.

With the development of the aforementioned technologies and wireless communication systems, various services may be provided, and there is a need for a method for effectively providing the services.

DESCRIPTION OF EMBODIMENTS

Technical Problem

An embodiment of the disclosure provides a method and apparatus for effectively providing services in a wireless communication system.

Solution to Problem

According to an embodiment of the disclosure, a method, performed by a user equipment (UE), of repeatedly transmitting control information in a wireless communication system includes: receiving, from a base station (BS), a control information repetition configuration including a repetition level parameter which indicates a number of repeatedly transmitted control resource sets (CORESETs); and performing blind decoding on the repeatedly transmitted CORESETs, based on the control information repetition configuration.

According to an embodiment of the disclosure, a method, performed by a BS, of repeatedly transmitting control information in a wireless communication system includes: transmitting, to a UE, a control information repetition configuration including a repetition level parameter which indicates a number of repeatedly transmitted CORESETs; and repeatedly transmitting CORESETs, based on the control information repetition configuration.

According to an embodiment of the disclosure, a UE in a wireless communication system includes: a transceiver configured to transmit or receive a signal to or from a BS; a memory storing a program and data for repetitive transmission of control information by the UE; and a processor configured to execute the program stored in the memory to receive, from the BS, a control information repetition configuration including a repetition level parameter which indicates a number of repeatedly transmitted control resource sets (CORESETs), and perform blind decoding on the repeatedly transmitted CORESETs, based on the control information repetition configuration.

According to an embodiment of the disclosure, a BS in a wireless communication system includes: a transceiver configured to transmit or receive a signal to or from a UE; a memory storing a program and data for repetitive transmission of control information by the BS; and a processor configured to execute the program stored in the memory to transmit, to the UE, a control information repetition configuration including a repetition level parameter which indicates a number of repeatedly transmitted CORESETs, and repeatedly transmit CORESETs, based on the control information repetition configuration.

Advantageous Effects of Disclosure

According to embodiments of the disclosure, services may be effectively provided in a wireless communication system.

BEST MODE

Figure 1:
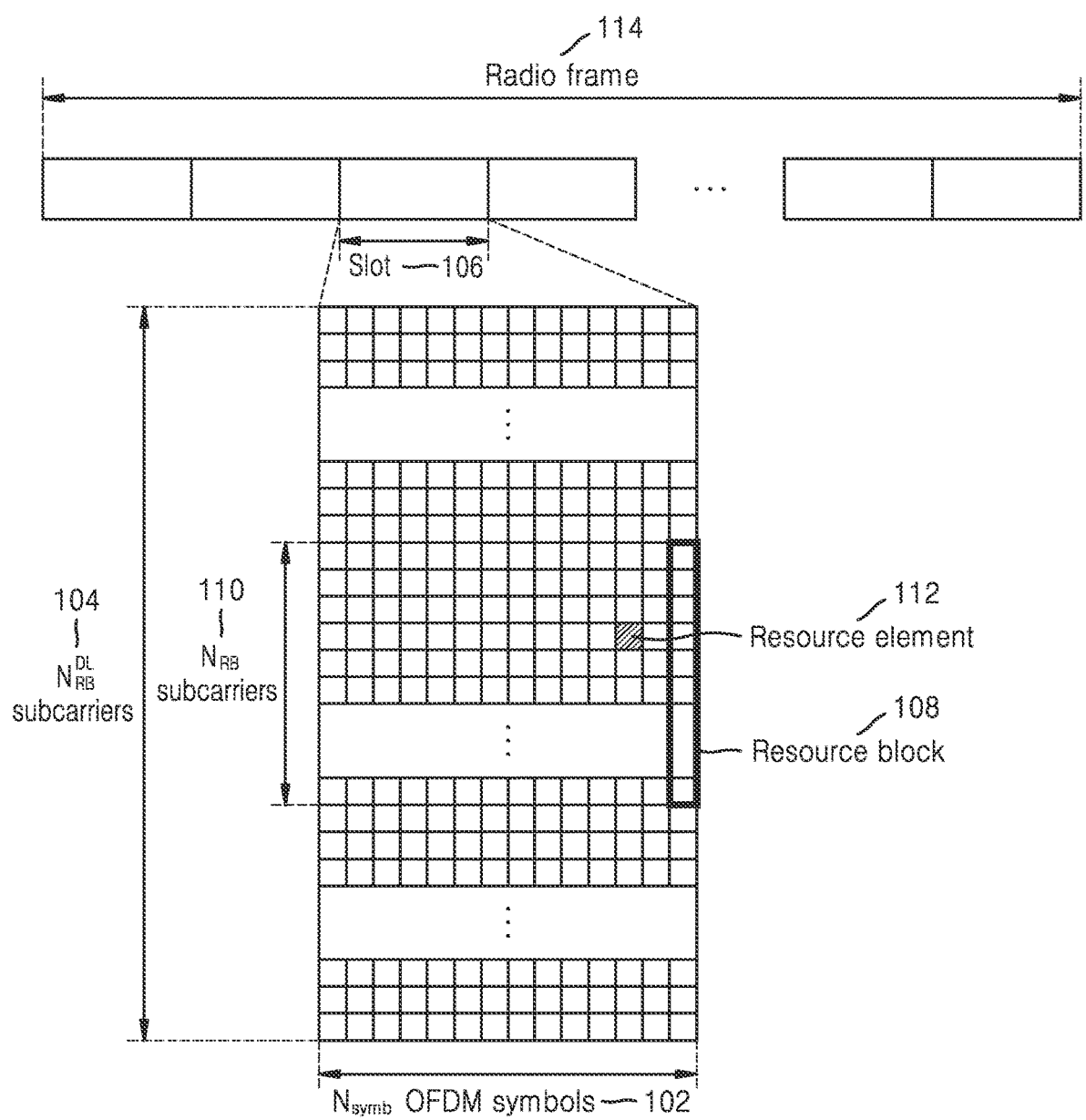
FIG. 1 illustrates a transport structure of the time-frequency domain, which is a radio resource domain of a 5G or new radio (NR) system.

According to an embodiment of the disclosure, a method, performed by a user equipment (UE), of repeatedly transmitting control information in a wireless communication system includes: receiving, from a base station (BS), a control information repetition configuration including a repetition level parameter which indicates a number of repeatedly transmitted control resource sets (CORESETs); and performing blind decoding on the repeatedly transmitted CORESETs, based on the control information repetition configuration.

In an embodiment, the receiving of the control information repetition configuration may include receiving, by higher layer signaling, CORESET configuration information or search space configuration information including the repetition level parameter.

In an embodiment, the performing of the blind decoding on the repeatedly transmitted CORESETs may include determining whether a repeatedly transmitted CORESET extends over a slot boundary; and comparing a value of the repetition level parameter with a threshold when the repeatedly transmitted CORESET extends over the slot boundary, and when the value of the repetition level parameter is greater than the threshold, blind decoding may not be performed on the CORESET extending over the slot boundary.

In an embodiment, the performing of the blind decoding on the repeatedly transmitted CORESETs may include performing blind decoding on the repeatedly transmitted CORESET when the repeatedly transmitted CORESET does not extend over the slot boundary or when the value of the repetition level parameter is less than the threshold even when the repeatedly transmitted CORESET extends over the slot boundary.

In an embodiment, the performing of the blind decoding on the repeatedly transmitted CORESETs may include determining whether the repeatedly transmitted CORESET has an overlapping resource domain with an original CORESET different from the CORESET, a sync signal, or a physical broadcast channel (PBCH), and when the repeatedly transmitted CORESET has the overlapping resource domain with the original CORESET different from the CORESET, the sync signal, or the PBCH, blind decoding is not performed on the overlapping CORESET.

In an embodiment, the performing of the blind decoding on the repeatedly transmitted CORESETs may include determining whether to perform blind decoding based on at least one of a physical downlink control channel (PDCCH) candidate index or an aggregation level.

In an embodiment, the determining of whether to perform blind decoding based on at least one of the PDCCH candidate index or the aggregation level may include performing blind decoding on CORESETs including at least one of a same PDCCH candidate index or a same aggregation level.

In an embodiment, the determining of whether to perform blind decoding based on at least one of the PDCCH candidate index or the aggregation level may include performing blind decoding on a CORESET including at least one of a particular PDCCH candidate index or a particular aggregation level.

In an embodiment, in the determining of whether to perform blind decoding based on at least one of the PDCCH candidate index or the aggregation level, blind decoding may not be performed on a CORESET including at least one of a particular PDCCH candidate index or a particular aggregation level or not including at least one of the particular PDCCH candidate index and the particular aggregation level.

According to an embodiment, a method, performed by a BS, of repeatedly transmitting control information in a wireless communication system includes: transmitting, to a UE, a control information repetition configuration including a repetition level parameter which indicates a number of repeatedly transmitted CORESETs; and repeatedly transmitting CORESETs, based on the control information repetition configuration.

According to an embodiment, a UE in a wireless communication system includes a transceiver configured to transmit or receive a signal to or from a BS; a memory storing a program and data for repetitive transmission of control information by the UE; and a processor configured to execute the program stored in the memory to receive, from the BS, a control information repetition configuration including a repetition level parameter which indicates a number of repeatedly transmitted CORESETs, and perform blind decoding on the repeatedly transmitted CORESETs based on the control information repetition configuration.

In an embodiment, the processor may be configured to control CORESET configuration information or search space configuration information including the repetition level parameter to be received by higher layer signaling.

In an embodiment, the processor may be configured to determine whether a repeatedly transmitted CORESET extends over a slot boundary, and compare a value of the repetition level parameter with a threshold when the repeatedly transmitted CORESET extends over the slot boundary, wherein blind decoding may not be performed on the CORESET extending over the slot boundary when the value of the repetition level parameter is greater than the threshold.

In an embodiment, the processor may be configured to perform blind decoding on the repeatedly transmitted CORESET when the repeatedly transmitted CORESET does not extend over the slot boundary or when the value of the repetition level parameter is less than the threshold even when the repeatedly transmitted CORESET extends over the slot boundary.

In an embodiment, the processor may determine whether the repeatedly transmitted CORESET has an overlapping resource domain with an original CORESET different from the CORESET, a sync signal, or a physical broadcast channel (PBCH), wherein blind decoding may not be performed on the overlapping CORESET when the repeatedly transmitted CORESET has the overlapping resource domain with the original CORESET different from the CORESET, the sync signal, or the PBCH.

In an embodiment, the processor may be configured to determine whether to perform blind decoding based on at least one of a PDCCH candidate index or an aggregation level.

In an embodiment, the processor may be configured to perform blind decoding on CORESETs including at least one of a same PDCCH candidate index or a same aggregation level.

In an embodiment, the processor may be configured to perform blind decoding on a CORESET including at least one of a particular PDCCH candidate index or a particular aggregation level.

In an embodiment, blind decoding may not be performed by the processor on a CORESET that includes at least one of the particular PDCCH candidate index or the particular aggregation level or that does not include at least one of the particular PDCCH candidate index or the particular aggregation level.

According to an embodiment, a BS in a wireless communication system includes a transceiver configured to transmit or receive a signal to or from a UE; a memory storing a program and data for repetitive transmission of control information by the BS; and a processor configured to execute the program stored in the memory to transmit, to the UE, a control information repetition configuration including a repetition level parameter which indicates a number of repeatedly transmitted CORESETs, and repeatedly transmit CORESETs, based on the control information repetition configuration.

MODE OF DISCLOSURE

Embodiments of the disclosure will now be described with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those of skill in the art. Like numbers refer to like elements throughout the specification.

It will be understood that each block and combination of the blocks of a flowchart may be performed by computer program instructions. The computer program instructions may be loaded on a processor of a universal computer, a special-purpose computer, or other programmable data processing equipment, and thus, they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, and accordingly, a product that contains instruction means for performing functions described in the block(s) of the flowchart may be manufactured. The computer program instructions may also be loaded on computers or programmable data processing equipment, and thus, the instructions may generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program code, drivers, firmware, microcode, circuits, data, databases, data structures, tables, arrays, and variables. Functions served by components and modules may be combined into a less number of components and modules, or further divided into a greater number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e communication standards. Furthermore, for the fifth generation (5G) wireless communication system, communication standards for 5G or new radio (NR) are being made.

As a representative example of a wide band wireless communication system, the 5G or NR system employs orthogonal frequency division multiplexing schemes for downlink (DL) and uplink (UL). Specifically, a cyclic prefix OFDM (CP-OFDM) scheme is employed for DL, and together with the CP-OFDM, a discrete Fourier transform spreading OFDM (DFT-S-OFDM) scheme is employed for UL. The UL refers to a radio link for a terminal (or user equipment (UE) or a mobile station (MS)) to transmit data or a control signal to a base station (BS, gNode B, or eNode B), and the DL refers to a radio link for a BS to transmit data or a control signal to a terminal Such a multiple access scheme allocates and operates time-frequency resources for carrying data or control information for respective users not to overlap each other, i.e., to maintain orthogonality, thereby differentiating each user's data or control information.

The 5G or NR system adopts a Hybrid Automatic Repeat request (HARQ) scheme that re-transmits corresponding data through a physical layer in a case that decoding fails at the initial stage of transmission. By the HARQ scheme, if a receiver fails to correctly decode data, the receiver transmits information indicating the decoding failure (NACK; Negative Acknowledgment) to a transmitter so that the transmitter may re-transmit the corresponding data through the physical layer. The receiver increases data reception capability by combining the data re-transmitted by the transmitter with the data for which decoding has failed. Further, in a case that the receiver correctly decodes data, the receiver may transmit information indicating decoding success (ACK; Acknowledgment) to the transmitter so that the transmitter may transmit new data.

In the meantime, an NR system for new 5G communication is designed to freely multiplex various services in time and frequency resources, so that a waveform/numerology or the like, and a reference signal or the like, may be dynamically or freely allocated as required for the corresponding service. For wireless communication to provide a best service to a terminal, it is important to optimize data transmission through measurement of quality and interference of a channel, and accordingly, channel state measurement is essential. However, unlike the fourth generation (4G) communication where channel and interference properties are not significantly changed depending on frequency resources, a 5G or NR channel has channel and interference properties that significantly change depending on services and is thus required to support a frequency resource group (FRG)-wise subset, which enables division of the measurement. In the meantime, service types supported in the 5G or NR system may be divided into categories, such as Enhanced Mobile BroadBand (eMBB), massive Machine Type Communications (mMTC), Ultra-Reliable and Low-Latency Communications (URLLC), etc. The eMBB is a service for high rate transmission of high volume data, the mMTC is a service for least power consumption at the UE and accesses of multiple UEs, and the URLLC is a service for high reliability and low latency, without being limited thereto. Depending on the type of service applied to the terminal, different requirements may be applied.

Of the aforementioned services, the URLLC service has a goal of high reliability and low latency, so control information and data information to be transmitted on a physical channel may be required to be transmitted at low coding rates. As for the control information, repetitive transmission functions for control information have already been introduced in machine type communications (MTC) or narrow band Internet of things (NB-IoT) services of an LTE system. A purpose of introducing the repetitive transmission function for control information is to provide high coverage for UEs having narrow bandwidth, but in this case, latency has not been sufficiently taken into account. Furthermore, a minimum unit of repetitive transmission of control information is fixed to a subframe unit based on the LTE system. To support the URLLC service in an NR or 5G system, there is a need for a repetitive transmission mode for control information that may improve reliability while requiring low latency. Hence, the disclosure basically considers an occasion where control information is repeatedly transmitted in a slot. In addition, an occasion where control information is repeatedly transmitted over the boundary of a slot may also be considered. A UE may detect control information transmitted from a BS, earlier with high reliability according to an operation provided in the disclosure.

Terms used in the disclosure are defined by taking the respective functionalities into account, but may vary depending on certain practices or intentions of users or operators. Accordingly, the terms should be defined based on descriptions throughout this specification. In the following description, a base station is an entity for performing resource allocation for a UE, and may be at least one of a gNB, an eNB, a Node B, a BS, a radio access unit, a base station controller (BSC), or a network node. A terminal may include a user equipment (UE), a mobile station (MS), a cellular phone, a smartphone, a computer, or a multimedia system capable of performing a communication function. Herein, DL refers to a radio transmission path for a signal transmitted from a BS to a terminal, and UL refers to a radio transmission path for a signal transmitted from a terminal to a BS. Furthermore, although an NR system will be described as an example in the disclosure, it is not limited thereto and embodiments of the disclosure may also be applied to other various communication systems having a similar technical background or channel type. Furthermore, embodiments of the disclosure will also be applied to different communication systems with some modifications to such an extent that does not significantly deviate from the scope of the disclosure as determined by those of skill in the art.

In the disclosure, the conventional terms 'physical channel' and 'signal' may be interchangeably used with data or a control signal. For example, a physical downlink shared channel (PDSCH) is a physical channel on which to transmit data, but in the disclosure, the PDSCH may also be called data.

In the disclosure, upper layer signaling is a method of transferring a signal to the UE from the BS on a DL data channel of the physical layer or to the BS from the UE on a UL data channel of the physical layer, and may also be referred to as RRC signaling or an MAC control element (CE).

In the meantime, as a study on next generation communication systems is being conducted these days, various schemes for scheduling communication with a UE are being discussed. Hence, an efficient scheduling and data transmission/reception scheme considering characteristics of the next generation communication system is required. To provide a plurality of services for a user in the communication system, a method of providing the respective services to fit their characteristics in a same time interval and a corresponding apparatus are required.

FIG. 1 illustrates a transport structure of the time-frequency domain, which is a radio resource domain of a 5G or NR system.

Referring to FIG. 1, in the radio resource domain, the horizontal axis represents the time domain, and the vertical axis represents the frequency domain. A minimum transmission unit in the time domain is an OFDM symbol, and $N_{symb}$ OFDM symbols 102 together define a slot 106. A length of a subframe may be defined to be 1.0 ms, and a length of a radio frame 114 may be defined to be 10 ms. A minimum transmission unit in the frequency domain is a subcarrier, and bandwidth of the whole system transmission band may be comprised of a total of $N_{BW}$ subcarriers 104. These specific numerical values may be, however, variously applied depending on the system.

A basic unit in the time-frequency resource domain is a resource element (RE) 112, which may be represented by an OFDM symbol index and a subcarrier index. A resource block (RB) 108 or a physical resource block (PRB) may be defined with $N_{symb}$ successive OFDM symbols 102 in the time domain and $N_{RB}$ successive subcarriers 110 in the frequency domain. Accordingly, one RB 108 may be comprised of $N_{symb} \times N_{RB}$ REs 112.

Generally, a minimum transmission unit of data is an RB. In the 5G or NR system, it is common that $N_{symb}=14$, $N_{RB}=12$, and $N_{BW}$ and $N_{RB}$ may be proportional to the bandwidth of a system transmission band. Data rate increases in proportion to the number of RBs scheduled for the UE. In the 5G or NR system, for an FDD system differentiating and operating DL and UL by frequency, DL transmission bandwidth may differ from UL transmission bandwidth. Channel bandwidth refers to radio frequency (RF) bandwidth corresponding to the system transmission bandwidth. Table 1 represents correspondence between system transmission bandwidth and channel bandwidth defined in an LTE system for 4G wireless communication before the 5G or NR system. For example, the LTE system having a 10 MHz channel bandwidth has a transmission bandwidth of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

The 5G or NR system may be operated in wider channel bandwidth than the channel bandwidth for LTE presented in Table 1. Table 2 represents correspondence between system transmission bandwidth, channel bandwidth, and subcarrier spacing (SCS) in the 5G or NR system.

TABLE 2

| | SCS [kHz] | Channel bandwidth $BW_{Channel}$ [MHz] | | | | | | | | | |
|---|---|---|---|---|---|---|---|---|---|---|---|
| | | 5 | 10 | 15 | 20 | 25 | 40 | 50 | 60 | 80 | 100 |
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information on DL data or UL data is transferred through downlink control information (DCI) from the BS to the UE. The DCI may be defined in various formats, and depending on each format, the DCI may indicate whether it is scheduling information (UL grant) for UL data or scheduling information (DL grant) for DL data, whether it is compact DCI with small-sized control information, whether spatial multiplexing is applied using multiple antennas, whether it is DCI for power control, etc. For example, DCI format 1-1 that is scheduling control information for DL data (DL grant) may include one piece of the following control information:

carrier indicator: indicates which frequency carrier is used for transmission.

DCI format indicator: an indicator for distinguishing whether the DCI is for DL or UL.

bandwidth part (BWP) indicator: indicates which BWP is used for transmission.

frequency domain resource allocation: indicates an RB in the frequency domain allocated for data transmission. A resource represented by system bandwidth and a resource allocation scheme is determined.

time domain resource allocation: indicates which slot and which OFDM symbol in the slot are used to transmit a data-related channel.

VRB-to-PRB mapping: indicates which scheme is used to map a virtual RB (VRB) index and a physical RB (PRB) index.

modulation and coding scheme (MCS): indicates a modulation scheme and a coding rate used for data transmission. Specifically, it may indicate a coding rate value that may give information about a transport block size (TBS) and channel coding along with information about whether it is quadrature phase shift keying (QPSK), 16 quadrature amplitude modulation (16QAM), 64QAM, or 256QAM.

code block group (CBG) transmission information: indicates information about which CBG is transmitted when CBG retransmission is configured.

HARQ process number: indicates a process number of an HARQ.

new data indicator: indicates whether it is HARQ initial transmission or retransmission.

redundancy version: indicates a redundancy version of an HARQ.

transmit power control (TPC) command for physical uplink control channel (PUCCH): indicates a transmit power control command for UL control channel PUCCH.

For the aforementioned PUSCH transmission, time domain resource allocation may be delivered by information about a slot in which a PUSCH is transmitted, a start OFDM symbol position S in the slot, and the number L of OFDM symbols to which the PUSCH is mapped. The S may be a relative position from the beginning of the slot, the L may be the number of successive OFDM symbols, and the S and L may be determined from a start and length indicator value (SLIV) defined as follows:

If $(L-1)=7$ then $$SLIV=14\cdot(L-1)+S$$

else $$SLIV=14\cdot(14-L+1)+(14-1-S)$$

where $0<L=14-S$

The 5G or NR system may be configured with a table including information about an SLIV value, a PUSCH mapping type, and a slot in which the PUSCH is transmitted in a row commonly through RRC configuration. Subsequently, time domain resource allocation in DCI indicates an index value in the configured table, so that the BS may deliver information about an SLIV value, a PUSCH mapping type, and a slot in which the PUSCH is transmitted to the UE.

In the 5G or NR system, type A and type B are defined for the PUSCH mapping type. For the PUSCH mapping type A, a first OFDM symbol of DMRS OFDM symbols is located in the second or third OFDM symbol in a slot. For the PUSCH mapping type B, a first OFDM symbol of DMRS OFDM symbols is located in the first OFDM symbol in a time domain resource allocated in PUSCH transmission.

DCI may be transmitted on a physical downlink control channel (PDCCH) (or control information, which is interchangeably used with the PDCCH) after undergoing channel coding and modulation processes.

In general, DCI is scrambled by a specific radio network temporary identifier (RNTI) separately for each UE, having cyclic redundancy check (CRC) added thereto, channel-coded, and then configured and transmitted in a separate PDCCH. The PDCCH is mapped and transmitted in a control resource set (CORESET) configured for the UE.

DL data may be transmitted on a physical downlink shared channel (PDSCH), which is a physical channel for DL data transmission. The PDSCH may be transmitted after a control channel transmission interval, and scheduling information such as a specific mapping position in the frequency domain, modulation scheme, etc., is determined based on the DCI transmitted through the PDCCH.

Through an MCS of the control information that makes up the DCI, the BS notifies the UE of a modulation scheme applied to the PDSCH for transmission and the size of data to be transmitted (transport block size; TBS). In an embodiment of the disclosure, an MCS may be comprised of 5 bits or more than or less than 5 bits. The TBS corresponds to the size of a transport block (TB) to be transmitted by the BS before channel coding for error correction is applied to the data.

In the disclosure, the transport block (TB) may include a medium access control (MAC) header, a MAC control element (CE), one or more MAC service data units (MAC SDU), and padding bits. Alternatively, the TB may represent a data unit or a MAC protocol data unit (MAC PDU) sent down to the physical layer from the MAC layer.

The 5G or NR system supports the following modulation schemes: Quadrature Phase Shift Keying (QPSK), Quadrature Amplitude Modulation (16QAM), 64QAM, and 256QAM, and their respective modulation orders Qm are 2, 4, 6, and 8. For example, two bits per symbol may be transmitted for QPSK modulation, 4 bits per OFDM symbol for 16QAM modulation, 6 bits per symbol for 64QAM modulation, and 8 bits per symbol for 256QAM modulation.

Figure 2:
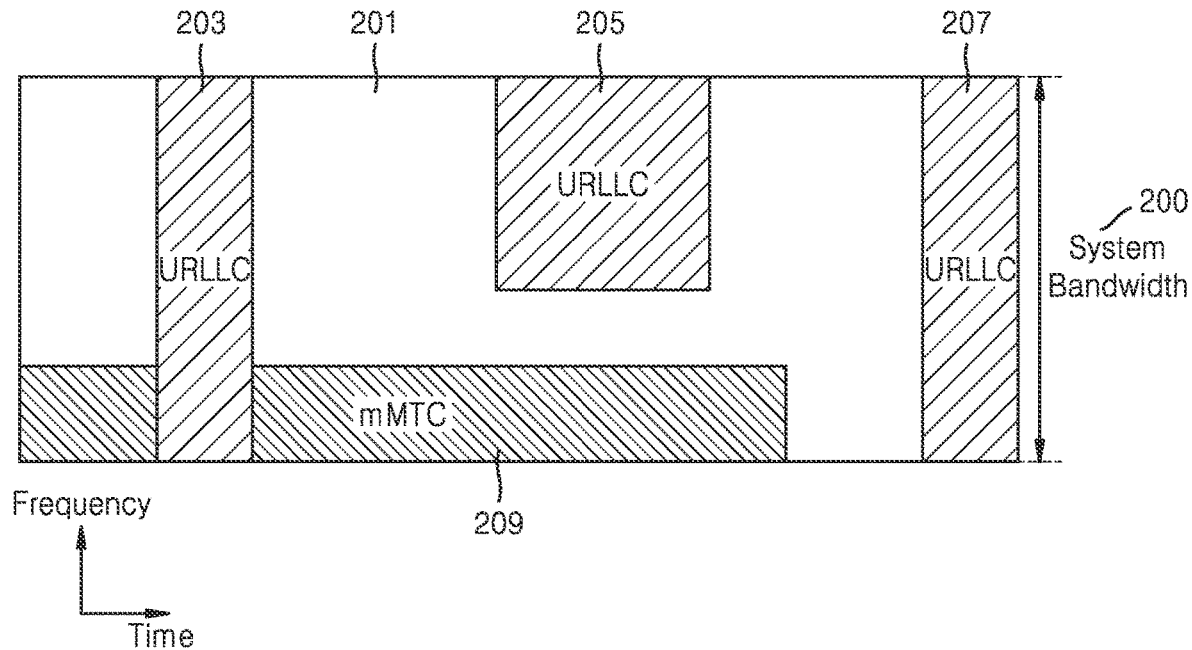
FIG. 2 is a diagram for describing a method of allocating data for enhanced mobile broadband (eMBB), ultra-reliable and low latency communications (URLLC), and massive machine type communications (mMTC) in a time-frequency resource domain in a 5G or NR system.

FIG. 2 is a diagram for describing how to allocate data for eMBB, URLLC, and mMTC in a time-frequency resource domain in a 5G or NR system.

Referring to FIG. 2, data for eMBB, URLLC, and mMTC may be allocated in a whole system frequency band 200. When URLLC data 203, 205, and 207 occurs and needs to be transmitted while eMBB 201 and mMTC 209 are allocated and being transmitted in a particular frequency band, the URLLC data 203, 205, and 207 may be transmitted without emptying or transmitting a part already allocated the eMBB 201 and the mMTC 209. Of the aforementioned services, URLLC requires reduction in latency, so that the URLLC data may be allocated and transmitted in a portion of a resource allocated the eMBB or mMTC. When URLLC is further allocated and transmitted in a resource allocated eMBB, the eMBB data may not be transmitted in the overlapping time-frequency resource, and accordingly, transmission performance for the eMBB data may be reduced. In other words, eMBB data transmission failure may occur due to the URLLC allocation.

Figure 3:
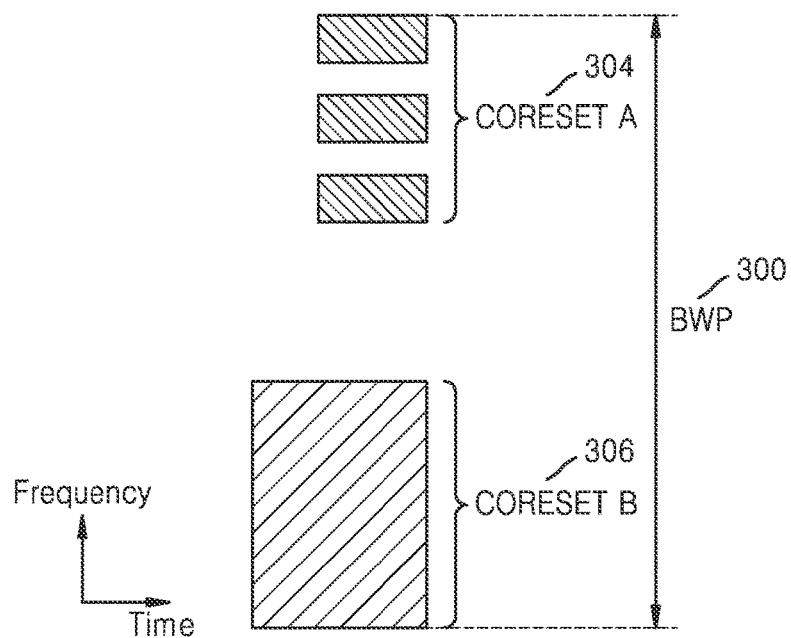
FIG. 3 is a diagram for describing control resource sets (CORESETs) in a 5G or NR system.

FIG. 3 is a diagram for describing control resource sets (CORESETs) in a 5G or NR system.

In a 5G or NR system, a UE may be configured with a maximum of 4 CORESETs in an activated bandwidth part (BWP). To be configured with a CORESET, the following configuration information may be received by higher layer signaling.

ControlResourceSetId: an ID allocated for a CORESET frequencyDomainResources: a field indicating a CORESET frequency resource domain, which is allocated in a bitmap of 6 RBs duration: a field indicating a CORESET time resource domain, which is comprised of successive symbols.

cce-REG-MappingType: a field indicating which type is used to map control channel elements (CCEs) comprised of 6 resource element groups (REGs), among an interleaved type and a non-interleaved type precodergranularity: a field indicating whether the same precoding is applied in narrow bands (e.g., REG bundles) or the same precoding is applied over a wide band (e.g., all RBs of a BWP)

transmission configuration indicator (tci) related parameters: a field indicating quasi colocation (QCL) information pdcch-DMRS-ScramblingID: a field indicating scrambling information of a demodulation reference signal (DMRS) included in the PDCCH The UE receives CORESET configuration information including the aforementioned configuration information. Referring to FIG. 3, an occasion where two CORESET types are configured in an activated BWP 300. CORESET A 304 shows an occasion in which it is mapped discontinuously in a frequency resource domain. CORESET B 306 shows an occasion in which it is mapped continuously in a frequency resource domain. For example, the duration of CORESET A may be two symbols, CCE-REG-mappingtype may be 'interleaved', precodergranularity may be 'wideband', tci may not be configured, and pdcch-DMRS-ScaramblingID may be configured to be the same as cell ID.

Figure 4:
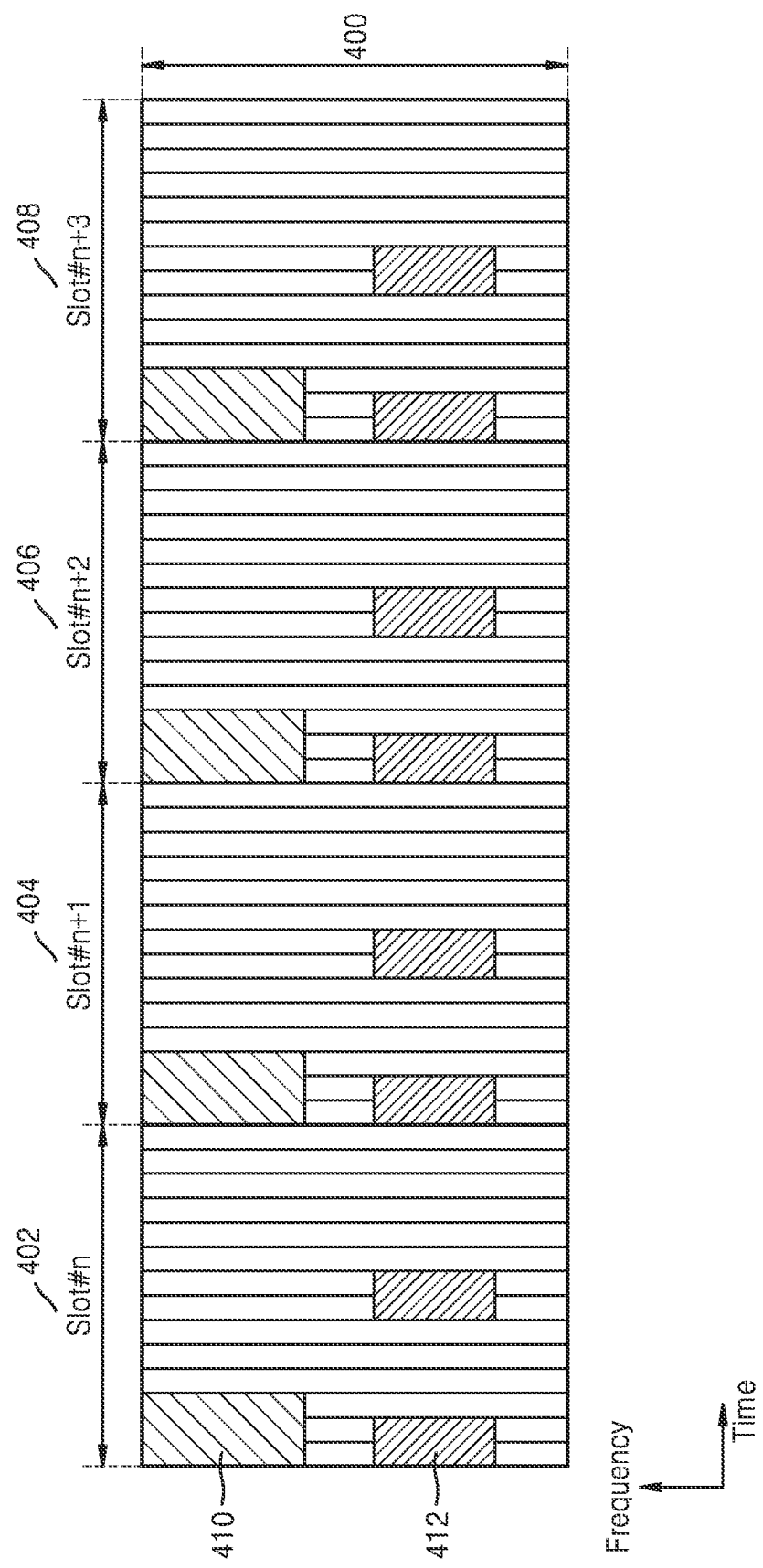
FIG. 4 is a diagram for describing a procedure of configuring a search space in which a user equipment (UE) monitors physical downlink control channels (PDCCHs) in a 5G or NR system.

FIG. 4 is a diagram for describing a procedure of configuring a search space in which a UE monitors PDCCHs in a 5G or NR system.

In the NR or 5G system, a UE may receive a maximum of 10 pieces of search space configuration information for each CORESET in an activated BWP. To be configured with a search space, the following configuration information may be received by higher layer signaling.

SearchSpaceID: an ID given for a search space configuration

ControlResourceSetID: a CORESET ID associated with the corresponding search space configuration MonitoringSlotperiodicityAndOffset: information indicating CORESET configuration information (periodicity and offset) at a slot level Duration: information indicating the number of slots in which CORESETs are successively located MonitoringSymbolsWithinSlot: information indicating CORESET configuration information at a symbol level NrofCandidates: information indicating the number of PDCCH candidates for each aggregation level configured in the corresponding search space SearchSpaceType: information indicating whether the search space is UE-common or UE-specific, and information indicating a DCI format to be monitored in the search space The UE receives search space configuration information including the aforementioned configuration information. Referring to FIG. 4, shown is an occasion where a search space 410 is configured with a 3-symbol CORESET and the CORESET is transmitted for each slot. The search space 410 is configured with the CORESET at the first symbol in each slot. A search space 412 is configured with a 2-symbol CORESET and the CORESET being transmitted for each slot. The search space 412 is configured with the CORESETs at the first and seventh symbols in each slot.

In the NR or 5G system, the UE may not monitor a PDCCH candidate only with the CORESET configuration information as described above in connection with FIG. 3. The UE may monitor a PDCCH candidate only after receiving the search space configuration information as described above in connection with FIG. 4 as well.

Figure 5:
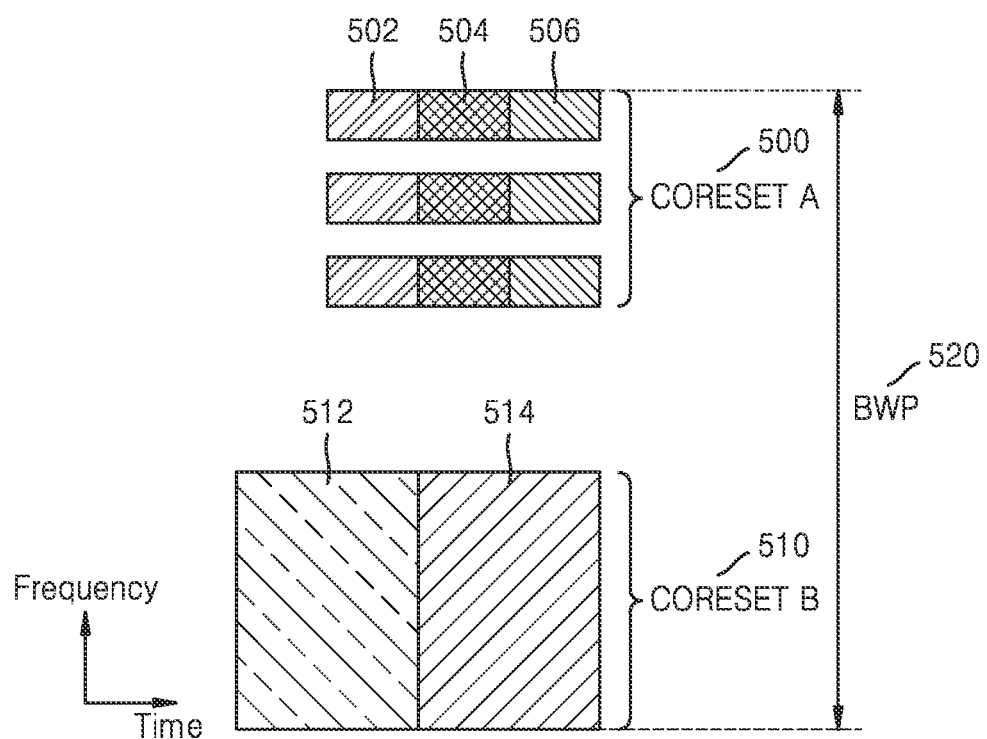
FIG. 5 is a diagram for describing CORESET configuration information in an occasion where a repetition related parameter is added to higher layer signaling configuration information, in an embodiment.

FIG. 5 is a diagram for describing CORESET configuration information in an occasion where a repetition related parameter is added to higher layer signaling configuration information, in an embodiment.

A repetition related parameter in CORESET configuration information is used to copy the CORESET configuration information on the time axis to repeatedly transmit the same DCI information. In other words, it means that the same DCI information is repeatedly transmitted in the CORESETs configured to be repeated. In PDCCH decoding, the UE may combine PDCCH candidates received in the CORESETs configured to be repeated and decode a result of the combining. The BS is supposed to transmit the same DCI information for the CORESET configured to be repeated.

In an embodiment, a parameter indicating the number of CORESETs configured to be repeated may be referred to as a repetition level. The repetition level parameter may be included in the CORESET configuration information and transmitted in higher layer signaling.

Referring to FIG. 5, CORESET A 500 and CORESET B 510 may include the repetition level parameter in the CORESET configuration information. The repetition level is 3 for CORESET A, and the repetition level is 2 for CORESET B. In CORESET A, a CORESET 502 is an original CORESET, and CORESETs 504 and 506 are repeatedly configured CORESETs. All of the CORESETs 502, 504, and 506 share the same CORESET configuration information. A CORESET that comes first in time may be called an original CORESET, and CORESETs that come after the original CORESET in time according to the repetition level may be called repeated corsets.

For example, when the CORESET 502 has a 2-symbol sized continuous time resource domain, the CORESETs 504 and 506 also have the 2-symbol sized continuous time resource domain. Furthermore, apart from this, all the configuration information as described above in connection with FIG. 3, such as of a frequency resource domain, except for the repetition level parameter, is equally applied. In an occasion where a repetition related parameter is added to the higher layer signaling configuration information as in FIG. 5, the following configuration information may be included to support the CORESET configuration information.

ControlResourceSetId: an ID allocated for a CORESET frequencyDomainResources: a field indicating a CORESET frequency resource domain, which is allocated in a bitmap of 6 RBs duration: a field indicating a CORESET time resource domain, which is comprised of successive symbols.

cce-REG-MappingType: a field indicating which type is used to map CCEs comprised of 6 REGs, among an interleaved type and a non-interleaved type precodergranularity: a field indicating whether the same precoding is applied in narrow bands (e.g., REG bundles) or the same precoding is applied over a wide band (e.g., all RBs of a BWP)

tci related parameters: a field indicating QCL information pdcch-DMRS-ScramblingID: a field indicating scrambling information of a DMRS included in the PDCCH Repetition level: a field of the number of repeated CORESETs, indicating that the same DCI may be transmitted in as many CORESETs as the repetition level.

Referring to FIG. 5, shown is an occasion where a gap between the repeatedly configured CORESETs, i.e., a value indicating how many symbols are there between the CORESETs, is set to 0. However, the gap may have another arbitrary value, instead of '0'.

In an embodiment, the gap may always be fixed to an arbitrary natural number. For example, the gap may always be fixed to '0'. Furthermore, in an embodiment, the gap may be added to the CORESET higher layer signaling configuration information, and thus may be explicitly notified to the UE. For example, the gap may be explicitly notified to the UE in a manner that a gap-related offset parameter is added to the configuration information to be transmitted to the UE by higher layer signaling. Furthermore, in an embodiment, the gap may be implicitly configured and changed by the repetition level or a time resource domain. For example, when the repetition level is greater than 2, the UE may determine that the gap is 0, and otherwise, 1. Alternatively, when a duration value indicating a time resource domain is greater than 2, the UE may determine that the gap is 0, and otherwise, 1.

In an embodiment, when a CORESET is configured to be repeated according to the search space configuration information as described above in connection with FIG. 4, the repetition configuration may be applied according to an aggregation level (AL) included in the search space configuration information.

In an embodiment, the repetition configuration may be applied according to a particular AL value. For example, when the AL value included in the search space configuration information is 4, only the PDCCH candidates of AL=4 that exist in each CORESET may transmit the same DCI repeatedly. That is, for other AL values, the same DCI may not be repeatedly transmitted. Alternatively, when the AL value included in the search space configuration information is 4, PDCCH candidates other than the PDCCH candidates of AL=4 that exist in each CORESET, i.e., PDCCH candidates having AL values instead of AL=4, may transmit the same DCI repeatedly. Furthermore, for example, even when repetition is configured for all AL values 1, 2, 4, 8, and 16 included in the search space configuration information, AL values used for actual PDCCH repetition are set to only 8 or 16. Referring to FIG. 5, the AL values 1, 2, 4, 8, and 16 are all set for CORESET A 502, but the repeated CORESETs 504 and 506 may be configured to be repeated only for PDCCH candidates having AL value 8 or 16. In other words, AL values 1, 2, and 4 are not used for PDCCH repetition, so the UE may monitor a PDCCH candidate having AL value 1, 2, or 4 only in the CORESET 502. As the AL value 8 or 16 is used for PDCCH repetition, the UE may monitor PDCCH candidates having AL value 8 or 16 in the CORESETs 502, 504, and 506, and the same DCI may be repeatedly repeated in the PDCCH candidates.

In an embodiment, AL values used for PDCCH repetition may be applied according to the set repetition level. For example, the UE determines that PDCCH candidates are repeated in CORESETs configured as many as the repetition level only for AL values 4, 8, and 16 when the repetition level is greater than 2, and that PDCCH candidates are repeated in CORESETs configured as many as the repetition level only for AL values 8 and 16 when the repetition level is less than 2.

In an embodiment, when repetition based CORESET information is configured according to the search space configuration information as described above in connection with FIG. 4, only PDCCH candidates having the same PDCCH candidate index in a search space hashing function for the respective repeated CORESETs may transmit the same DCI repeatedly. In this case, only the PDCCH candidates having the same PDCCH candidate index for each AL value may repeatedly transmit the same DCI. For example, when there are PDCCH candidate indexes 1 and 2 having AL value 8 in each CORESET for the repeated CORESETs, only PDCCH candidates having the index value 1 may repeatedly transmit the same DCI.

In an embodiment, PDCCH repetition may be applied only to the first PDCCH candidates. Specifically, PDCCH repetition may be applied only to the first PDCCH candidates for each AL value. Applying PDCCH repetition means that PDCCH candidates having a particular AL value and/or PDCCH candidate index for repeated CORESETs may be repeatedly transmitted with the same DCI. Referring to FIG. 5, in CORESET A, the CORESET 502 may be used for the UE to monitor PDCCH candidates having all search space indexes set for each AL, while the CORESETs 504 and 506 may be used for the UE to monitor only PDCCH candidates having the first search space index value for each AL.

In an embodiment, PDCCH repetition may be applied only to the first PDCCH candidates of some AL values. As described above, applying PDCCH repetition means that PDCCH candidates having a particular AL value and/or PDCCH candidate index for repeated CORESETs may be repeatedly transmitted with the same DCI. Accordingly, referring to FIG. 5 as an example, in CORESET A, the CORESET 502 may be used for the UE to monitor PDCCH candidates having all search space indexes set for each AL, while the CORESETs 504 and 506 may be used for the UE to monitor only PDCCH candidates having the first search space index value for a particular AL value.

Figure 6:
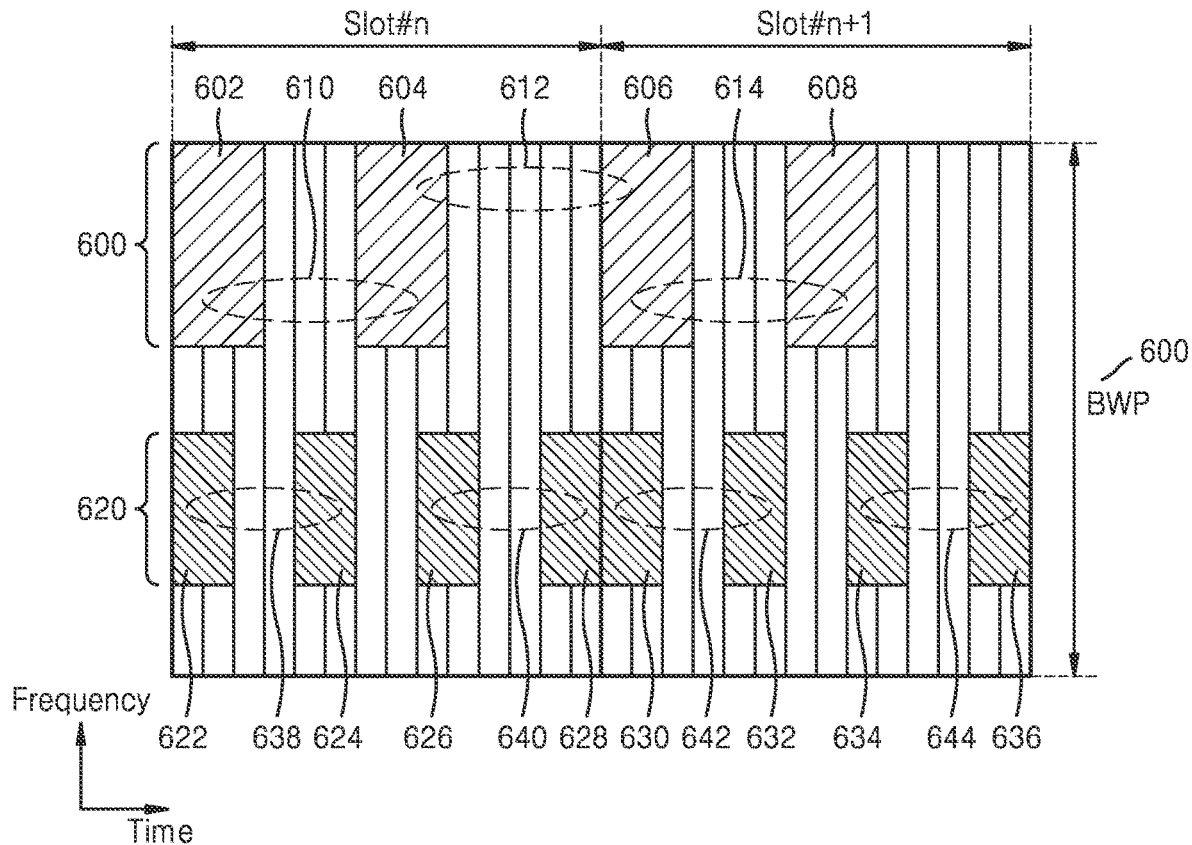
FIG. 6 is a diagram for describing search space configuration in an occasion where a repetition related parameter is added to higher layer signaling configuration information, in an embodiment.

FIG. 6 is a diagram for describing search space configuration in an occasion where a repetition related parameter is added to higher layer signaling configuration information, in an embodiment.

In the search space higher layer signaling configuration information, repetition related parameters may largely include the number of repetition times and repetition offset values. Referring to FIG. 6, a search space 600 is associated with a CORESET ID having the length of 3 symbols. Furthermore, shown is an occasion when the search space 600 has a monitoringsymbolswithinslot parameter {1, 7} and MonitoringSlotperiodicityAndOffset being 1 slot. A search space 620 is associated with a CORESET ID having the length of 2 symbols. Furthermore, an occasion when the search space 620 has a monitoringsymbolswithinslot parameter {1, 5, 9, 13} and MonitoringSlotperiodicityAndOffset being 1 slot is illustrated.

It is shown that the search space 600 and the search space 620 both have repetition level 2. The search space 600 has an offset of 1, and the search space 620 has an offset of 2. The CORESET 604 shows a relation that two CORESETs are repeated in the search space 600. The repetition relation may mean that PDCCH candidates configured in the two CORESETs may transmit the same DCI information. Furthermore, the offset refers to a gap between repeated reference CORESETs.

For example, the repetition level is 2 and the offset is 1 in the search space 600, so the CORESET 602 and the CORESET 604 may have a repetition relation 610. Furthermore, the CORESET 604 and a CORESET 606 may also have a repetition relation 612. The repetition relation may mean that the same DCI may be repeatedly transmitted on the PDCCH candidates configured in the CORESETs. In another example, the repetition level is 2 and the offset is 2 in the search space 620, so a CORESET 622 and a CORESET 624 may have a repetition relation 638, and a CORESET 626 and a CORESET 628 may have a repetition relation 640. The offset is 2 in the search space 620 and a CORESET may have only one repetition relation, while the offset is 1 in the search space 600 and a CORESET may have two relations of repetition.

In an occasion where a repetition related parameter is added to the higher layer signaling configuration information, the following configuration information may be included to support the search space configuration information.

SearchSpaceID: an ID given for a search space configuration

ControlResourceSetID: a CORESET ID associated with the corresponding search space configuration MonitoringSlotperiodicityAndOffset: information indicating CORESET configuration information (periodicity and offset) at a slot level Duration: information indicating the number of slots in which CORESETs are successively located MonitoringSymbolsWithinSlot: information indicating CORESET configuration information at a symbol level NrofCandidates: information indicating the number of PDCCH candidates for each aggregation level configured in the corresponding search space SearchSpaceType: information indicating whether the search space is UE-common or UE-specific, and information indicating a DCI format to be monitored in the search space Repetition level: a field of the number of repeated CORESETs, indicating that the same DCI may be transmitted in as many CORESETs as the repetition level.

Offset: a gap between repeated (reference) CORESET groups (CORESET occasion unit)

In the disclosure, although an occasion when the repetition related parameter including an offset value is included in the search space configuration information is taken as an example, the offset value may be implicitly determined to be equal to the repetition level value when there is only a repetition level parameter in an embodiment. In this case, as in the search space 620, a CORESET may only have one repetition relation. Explaining more accurate operations of an occasion having the repetition of relation, the same DCI information may be transmitted on the same or different PDCCH candidates based on a search space hashing function formed of combinations of an AL value, the number of PDCCH candidates, etc., set by separate higher layer signaling for each CORESET. The search space hashing function is expressed in following Equation 1:

$$L \cdot \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \mod \lfloor N_{CCE,p}/L \rfloor \right\} + i \qquad \text{Equation 1}$$

where L is an aggregation level, $m_{n_{CI}}$ is a PDCCH candidate index, $N_{CCE,p}$ is the number of CCEs, $n_{CI}$ is a carrier index, and $Y_{p,k_p}$ is always 0 for CSS and determined by a C-RNTI for USS. $M_{p,max}^{(L)}$ is a maximum number of PDCCH candidates, i=0, 1, . . . , L.

As described above, in Equation 1, $m_{n_{CI}}$ refers to a PDCCH candidate index in a particular CORESET, and in an embodiment, the same DCI may be repeatedly transmitted in the repeated CORESETs having the same AL value as the PDCCH candidate index. Furthermore, in an embodiment, repetitive transmission may be configured only for PDCCH candidates having a particular PDCCH candidate index or particular AL values. For example, for PDCCH candidates of which the index value corresponds to 1, the same DCI may be repeatedly transmitted in CORESETs having the repetition relation. In another example, the same DCI may be repeatedly transmitted in CORESETs having the repetition relation for all PDCCH candidates having AL value 16. Alternatively, the same DCI may be repeatedly transmitted in the CORESETs with only a combination of the aforementioned examples, e.g., particular ALs and particular indexes having a repetition relation. The configuration method for the operations may be divided into an implicit method and an explicit method. In an embodiment, in the implicit method, a fixed value (e.g., an index of 1 or an AL of 16) is always used, or a set of AL values or a set of PDCCH candidate indexes restricted by a repetition level may be used (e.g., when the repetition level is 2, only AL=16 is used). In the explicit method, it is possible to notify by higher layer signaling that the same DCI is repeatedly transmitted at a particular AL or particular index.

Referring to FIG. 6, according to a repetition level and offset configuration information, the CORESET 604 and the CORESET 606 may have a 612 even if the CORESETs 604 and 606 are present in different slots. The repetition relation 612 using different methods may be configured. In an embodiment, depending on a repetition level value, CORESETs that are present in different slots may be restricted from having a repetition level. For example, when the repetition level is equal to or less than 2, CORESETs having the repetition relation may be present in different slots, and otherwise, when the repetition level is equal to or greater than 2, CORESETs having the repetition relation may always be in the same slot. In this case, although CORESETs having the repetition relation applied based on a repetition level, offset configuration, or the like may be present in different slots, the BS and the UE may determine that the CORESETs do not have an actual repetition relation. The above description is merely an example, but may also be equally applied to an opposite occasion.

In an embodiment, the repetition related parameters as described above in connection with FIGS. 5 and 6 may be separately operated, or there may be only one of the two. The repetition related parameter included in the CORESET configuration information as described in connection with FIG. 5 may configure an occasion where, except time resources, all the same CORESETs have a gap and are repeatedly mapped as many times as a repetition level in time. The repetition related parameter included in the search space configuration information as described in connection with FIG. 6 may first configure slot level and mini-slot level search interval configuration information at which CORESETs are included in search space higher level configuration information and then provide information indicating whether the respective CORESETs have a repetition relation between them through repetition level or offset information.

In an embodiment, when there is no specific constraints on the occasion when the CORESETs are repeated as described above in connection with FIGS. 5 and 6, the UE may determine the number of PDCCH candidates for each AL value based on the associated search space higher level information for each CORESET. For example, when the repetition level is 2 and the number of PDCCH candidates is 5 for all AL values for each CORESET, a total of possible occasions when the same DCI may be repeatedly transmitted from the perspective of the UE is 25. Accordingly, the UE is required to perform blind combining and decoding on each of the occasions. From the perspective of the UE, the number of times of performing blind decoding to be performed increases in proportion to the repetition level and the number of PDCCH candidates configured in the CORESET. Hence, conditions of repetitive transmission of the same DCI need to be restricted by an extra condition. Regarding whether particular DCI is present in each repeated CORESET under a certain condition, there may be various methods as follows:

Method 1: Repetitive Transmission of the Same DCI is Allowed Only for the Same PDCCH Candidate Indexes the UE may expect the same DCI to be repeatedly transmitted only for the PDCCH candidates having the same PDCCH candidate index value for each CORESET. When there is no particular PDCCH candidate index value in at least one CORESET, the UE does not expect repetitive transmission of the same DCI for the PDCCH candidate index value. For the remaining CORESETs except the at least one CORESET, the same DCI may be repeatedly transmitted on PDCCH candidates indicated by the corresponding PDCCH candidate index value.

Method 2: Repetitive Transmission of the Same DCI is Allowed Only for a Particular PDCCH Candidate Index the UE may expect the same DCI to be repeatedly transmitted only for the PDCCH candidates having a particular PDCCH candidate index value for each CORESET. Repetitive transmission is not made for a CORESET that does not have the particular PDCCH candidate index value.

Method 3: Repetitive Transmission of the Same DCI is Allowed Only for the Same AL Values the UE may expect the same DCI to be repeatedly transmitted only for the PDCCH candidates corresponding to the same AL values for each CORESET. When the CORESET that may be repeated does not have the corresponding AL value, the UE does not expect the same DCI to be repeatedly transmitted for a PDCCH candidate corresponding to the corresponding AL value. The same DCI may be repeatedly transmitted for the remaining CORESETs except the CORESET.

Method 4: Repetitive Transmission of the Same DCI is Allowed Only for a Particular AL Value the same DCI may be repeatedly transmitted for the PDCCH candidates corresponding to the particular AL value for each CORESET. When a certain CORESET does not include the particular AL value, the same DCI is not repeatedly transmitted for PDCCH candidates corresponding to the particular AL value or the same DCI may be repeatedly transmitted only for CORESETs included in the rest of the repetition group except for the certain CORESET.

Method 5: A Combination of the Methods 1 to 4 the same DCI may be repeatedly transmitted for the PDCCH candidates having a particular PDCCH candidate index value and/or a particular AL value for each CORESET.

It was described that the same DCI is not repeatedly transmitted for a CORESET that does not satisfy the condition in the aforementioned methods, and in this regard, the repetition level may be extended into two methods. For example, for a total 5 CORESETs having repetition level 5, when the third CORESET does not satisfy one of the aforementioned conditions, the UE may determine that the same DCI may be repeatedly transmitted only for the remaining 4 CORESETs. In other words, the same DCI may be repeatedly transmitted only for valid CORESETS that satisfy the condition among the CORESETs corresponding to the set repetition level. In another example, for a total 5 CORESETs having repetition level 5, when the third CORESET does not satisfy one of the aforementioned conditions, the UE may determine that the same DCI may be repeatedly transmitted only for the remaining 4 CORESETs and a subsequent CORESET. In other words, the same DCI may be repeatedly transmitted for as many CORESETs as the repetition level value, which satisfy the condition.

The aforementioned methods, however, belong to an embodiment, and various modifications may be made to the embodiment. For example, in an embodiment, repetitive transmission of the same DCI may not be performed on a CORESET that includes at least one of a particular PDCCH candidate index and a particular aggregation level or that does not include at least one of the particular PDCCH candidate index and the particular aggregation level.

When the repetition level parameter is included in each CORESET configuration information or search space configuration information as described above in connection with FIGS. 5 and 6, an additional operation for determining validity of the actually repeated CORESETs may be required. For example, for reasons that the repeated CORESETs extend over a slot boundary or a particular CORESET resource is a reserved resource, or for a reason of a physical broadcast channel (PBCH) on which to transmit a sync signal or system information, a particular PDCCH candidate may or may not be configured to be repeated in a particular moment. The following is conditions for determining validity of repeated CORESETs.

condition 1: repeated CORESETs are all present in a slot

For example, even though two CORESETs have the repetition relation according to configuration of a repetition related parameter, it may be determined that the two have no repetition relation when they are present in different slots. For example, on an occasion when it is configured in higher information that 5 CORESETS have the repetition relation, when three of the CORESETS are included in the n-th slot and the remaining CORESETS are included in the (n+1)-th slot, only the three CORESETS included in the n-th slot allow repetitive transmission of the same DCI, or the repetitive transmission of the same DCI may be allowed for the three CORESETs included in the n-th slot and for the two CORESETS included in the (n+1)-th slot.

condition 2: When a particular CORESET may not transmit a PDCCH candidate configured to be repeated, the same DCI may be repeatedly transmitted for PDCCH candidates for the remaining CORESETs except for the particular CORESET.

The aforementioned conditions are, however, only an embodiment, and various modifications may be made to the embodiment. For example, in an embodiment, when a repeatedly transmitted CORESET extends over a slot boundary, whether to repeatedly transmit the same DCI may be determined by comparing the repetition level parameter value with a threshold. The threshold may have a value set by higher layer signaling or by a UE. When the repetition level parameter value is greater than the threshold, repetitive transmission of the same DCI may not be performed on the CORESET that extends over the slot boundary. Moreover, when a repeatedly transmitted CORESET does not extend over the slot boundary or when the repetition level parameter value is less than the threshold even though the repeatedly transmitted CORESET extends over the slot boundary, the repetitive transmission of the same DCI may be performed.

Furthermore, in an embodiment, whether a repeatedly transmitted CORESET has an overlapping resource domain with an original CORESET different from the CORESET, a sync signal, or a PBCH (physical broadcast channel) may be determined. When the repeatedly transmitted CORESET has the overlapping resource domain with the original CORESET different from the CORESET, the sync signal, or the PBCH, the same DCI may not be repeatedly transmitted for the overlapping CORESET.

In addition, in an embodiment, when only some PDCCH candidates of the repeatedly transmitted CORESET are overlapped, the same DCI may be repeatedly transmitted for the remaining PDCCH candidates that are not overlapped. In this case, using a PDCCH candidate having the next larger AL value for the AL value of the overlapping PDCCH candidate, the same DCI may be repeatedly transmitted. For example, when a PDCCH candidate having an AL value of 16 of the repeatedly transmitted CORESET is overlapped, the same DCI may not be repeatedly transmitted for the PDCCH candidate having the AL value of 16 but may be repeatedly transmitted for PDCCH candidates having the remaining AL values, or the same DCI may be repeatedly transmitted using a PDCCH candidate having a different AL value, e.g., a PDCCH candidate having the next larger AL value, 8, for 16.

Figure 7:
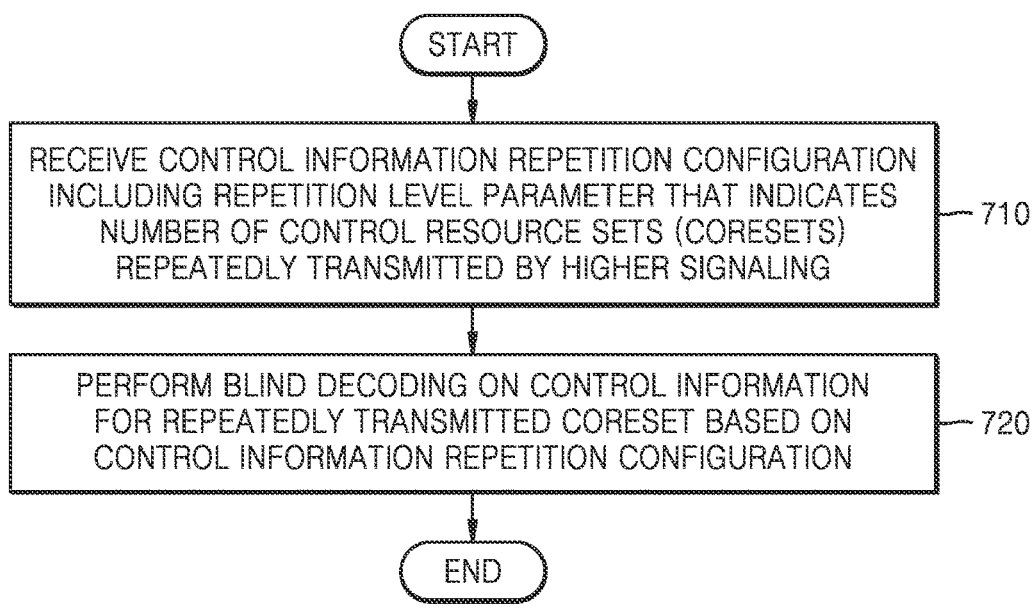
FIG. 7 is a flowchart illustrating a method of repeatedly transmitting control information of a UE, according to an embodiment.

FIG. 7 is a flowchart illustrating a method of repeatedly transmitting control information of a UE, according to an embodiment.

Referring to FIG. 7, in operation 710, the UE receives a control information repetition configuration including a repetition level parameter that indicates the number of repeatedly transmitted CORESETs (control resource sets) through higher layer signaling. In an embodiment, the UE may receive CORESET configuration information or search space configuration information including the repetition level parameter through higher layer signaling. The repetition level parameter may be received in the CORESET configuration information or in the search space configuration information. The aforementioned various configuration information may be included in the CORESET configuration information and the search space configuration information.

Subsequently, in operation 72, the UE performs blind decoding on the repeatedly transmitted CORESET based on the control information repetition configuration. In an embodiment, the repeatedly transmitted CORESETs include the same DCI information. In other words, the same DCI information is repeatedly transmitted in the CORESETs configured to be repeated.

Figure 8:
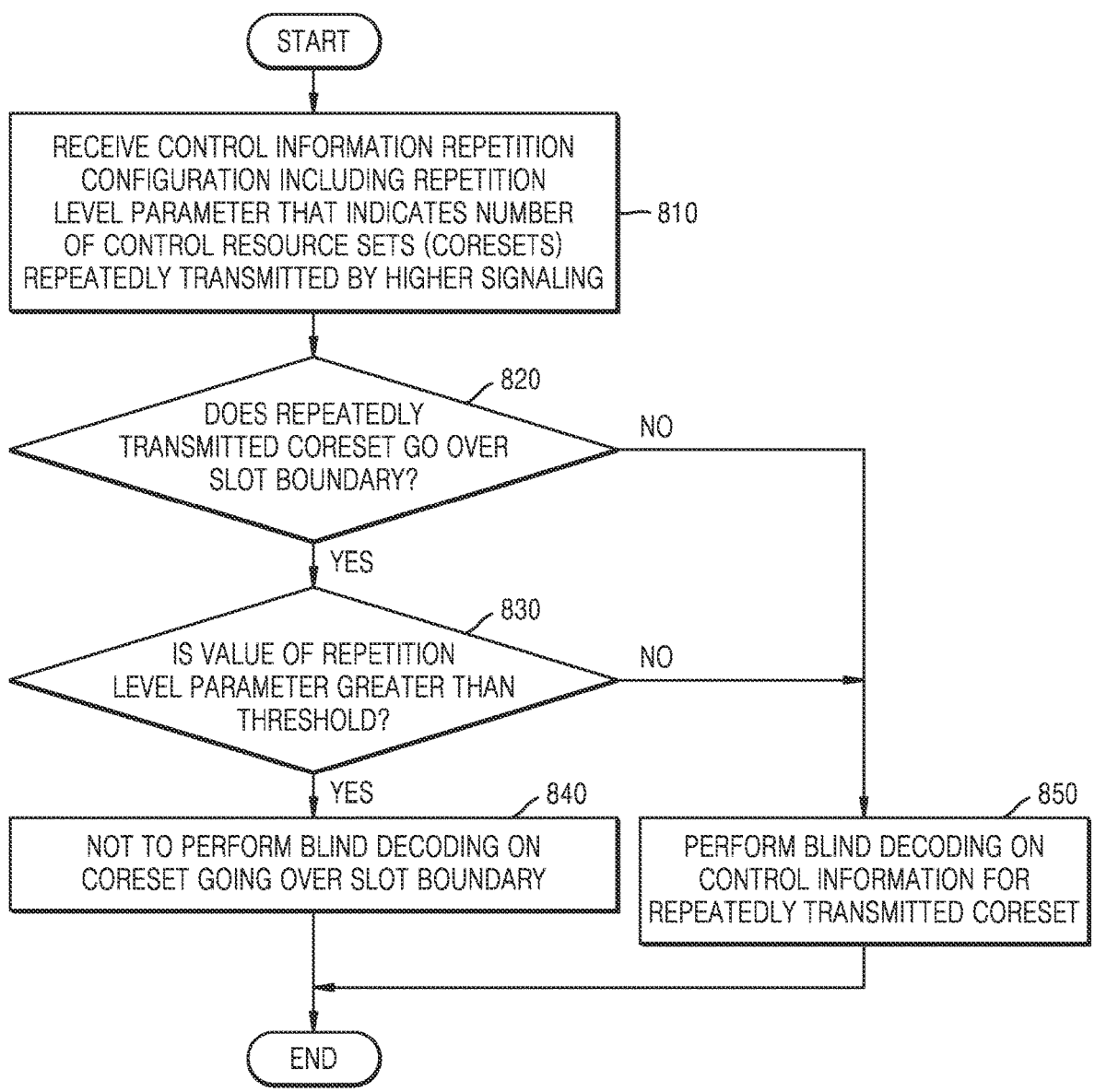
FIG. 8 is a flowchart illustrating a method of repeatedly transmitting control information of a UE, according to another embodiment.

FIG. 8 is a flowchart illustrating a method of repeatedly transmitting control information of a UE, according to an embodiment.

Referring to FIG. 8, in operation 810, the UE receives a control information repetition configuration including a repetition level parameter that indicates the number of repeatedly transmitted CORESETs through higher layer signaling. In an embodiment, the control information repetition configuration may include CORESET configuration information.

Subsequently, in operation 820, the UE determines whether a repeatedly transmitted CORESET extends over a slot boundary. Specifically, when mapping CORESETs to actual physical channels based on a repetition related parameter value included in the control information repetition configuration and additionally configured search space configuration information, the UE determines whether CORESETs having a repetition relation extend over a slot boundary.

For example, when of the CORESET configuration information, a gap is 0, CORESET duration is 3 symbols, and a repetition level is 2, it may be configured that a slot level search interval is 1 slot based on MonitoringSlotperiodicityAndOffset of the search space higher layer signaling configuration information and repeated CORESETs come from the 11th symbol in a slot based on MonitoringSymbolsWithinSlot. In this case, the first of CORESETs having repetition level 2 according to the CORESET and search space configuration information is present in the 11th to 13th symbols, and the second CORESET is present in the 14th symbol to the second symbol of the next slot. Accordingly, in this occasion, the second CORESET extends over the slot boundary even though having a repetition relation with the first CORESET. In other words, in operation 820, extending over a slot boundary may mean that repeated CORESETs are present in different slots or at least one of the repeated CORESETs is mapped to a different slot.

In operation 820, when it is determined that the repeatedly transmitted CORESET extends over a lost boundary, the UE proceeds to operation 830 to compare a value of the repetition level parameter with a threshold. When the value of the repetition level parameter is greater than the threshold in operation 830, the method proceeds to operation 840 where blind decoding is not performed on the CORESET that extends over a slot boundary. That is, blind decoding is not performed on CORESETs crossing the slot boundary or present in next slots.

When it is determined that the repeatedly transmitted CORESET does not extend over the slot boundary in operation 820, or when the value of the repetition level parameter is not greater than the threshold in operation 830, the UE proceeds to operation 850 to perform blind decoding on the repeatedly transmitted CORESET.

Although an embodiment of determining a repetition level value is described in FIG. 8, it may be determined whether to perform blind decoding based only on whether the repeated CORESETs extend over a slot boundary in the operation 820 without determining the repetition level value. In this case, the UE does not perform blind decoding on CORESETs that are crossing the slot boundary or present in next slots, when the repeated CORESETs extend over the slot boundary.

In an embodiment, when a BS configures CORESETs that allow repetitive transmission of control information through higher layer signaling, the BS may determine whether to allow repetitive transmission of control information in the CORESETs present in different slots according to points in time and a total number of times or an AL value of CORESETs that may be repeatedly transmitted. For example, when the number of CORESETs to be repeatedly transmitted is equal to or less than a certain threshold, the BS may allow repetitive transmission of CORESETs that extend over a slot boundary. Alternatively, when only at least one of CORESETs in which control information may be repeated is included in a first slot, the BS may allow repetitive transmission of the same DCI for CORESETs included in the subsequent second slot.

Figure 9:
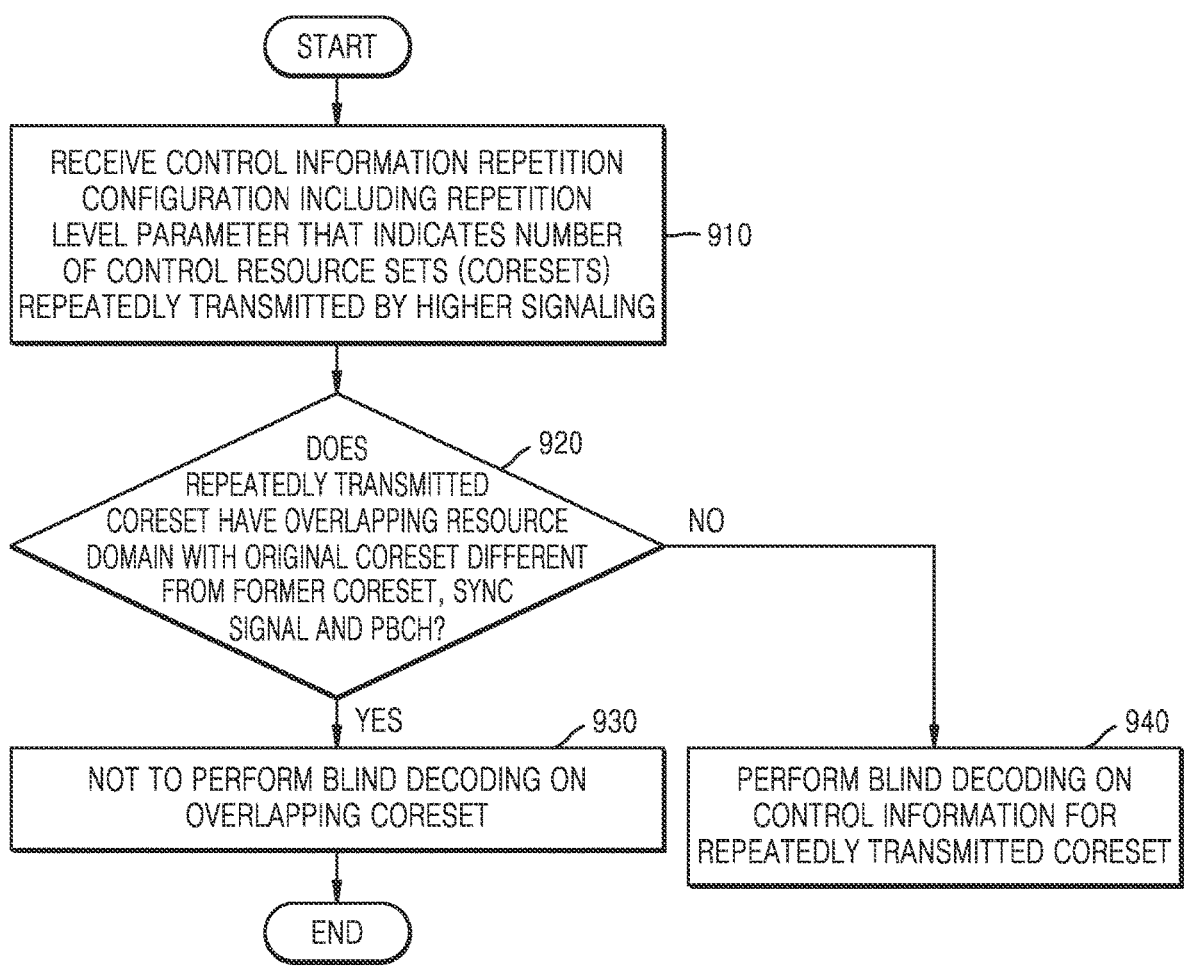
FIG. 9 is a flowchart illustrating a method of repeatedly transmitting control information of a UE, according to another embodiment.

FIG. 9 is a flowchart illustrating a method of repeatedly transmitting control information of a UE, according to another embodiment.

Referring to FIG. 9, in operation 910, the UE receives a control information repetition configuration including a repetition level parameter that indicates the number of repeatedly transmitted CORESETs through higher layer signaling. In an embodiment, the control information repetition configuration may include CORESET configuration information.

In operation 920, whether a repeatedly transmitted CORESET has an overlapping resource domain with an original CORESET different from the CORESET, a sync signal, or a PBCH (physical broadcast channel) is determined. The aforementioned CORESET group means a set of repeated CORESETs, and a CORESET that comes first in time may be called an original CORESET, and CORESETs that come after the original CORESET in time according to the repetition level may be called repeated CORESETs. Specifically, when a CORESET configured according to the search space configuration information is mapped to an actual physical channel resource domain, the UE determines whether a repeated CORESET overlaps other CORESETs.

For example, when of the CORESET configuration information, a gap is 0, CORESET duration is 3 symbols, and a repetition level is 2, it may be indicated that a slot level search interval is 1 slot based on MonitoringSlotperiodicityAndOffset of the search space higher layer signaling configuration information and repeated CORESETs come in first and fifth symbols in a slot based on MonitoringSymbolsWithinSlot. In this case, the repeated CORESET groups have 2 CORESETs having a length of 3 symbols from the first symbol that are successively present in time, and other CORESET groups have 2 CORESETs having a length of 3 symbols from the fifth symbol, which are successively present in time. Hence, when at least some of respective frequency resources are the same, different CORESET groups that are repeated may overlap in a physical channel resource domain.

In operation 920, when a repeated CORESET has an overlapping resource domain with an original CORESET different from the CORESET, a sync signal, or a PBCH (physical broadcast channel), the UE proceeds to operation 930 and does not perform blind decoding on the overlapping CORESETs. In an embodiment, the UE may not perform blind decoding only for the PDCCH candidates that are present in the overlapping region with the original CORESET.

In operation 920, when a repeated CORESET has an overlapping resource domain with an original CORESET different from the CORESET, a sync signal, or a PBCH (physical broadcast channel), the UE proceeds to operation 940 and performs blind decoding on the repeatedly transmitted CORESET.

In an embodiment, when a maximum number of times of performing blind decoding per slot, which may be performed by the UE, or a maximum number of CCEs is not exceeded even though the resource domain is overlapped, blind decoding may be performed on each of different PDCCH candidates in the overlapping resource domain.

In an embodiment, when particular CORESETs have repletion relations according to CORESET configuration information or search space configuration information, extra blind decoding and non-overlapping CCE may possibly occur for each slot. When the number of times of performing blind decoding or the number of non-overlapping CCEs per slot exceeds a value set in the standard due to repetition, the UE may not perform blind decoding in the repeated CORESET. Or, when the maximum value is exceeded after blind decoding is performed with the following priorities, the UE stops the blind decoding.
1. perform blind decoding on a PDCCH candidate for each CORESET without repetition
2. perform blind decoding on repeated PDCCH candidates in order from a PDCCH having a higher AL value to a PDCCH having a lower AL value FIG. 10 is a flowchart illustrating a method of repeatedly transmitting control information of a UE, according to another embodiment.

Figure 10:
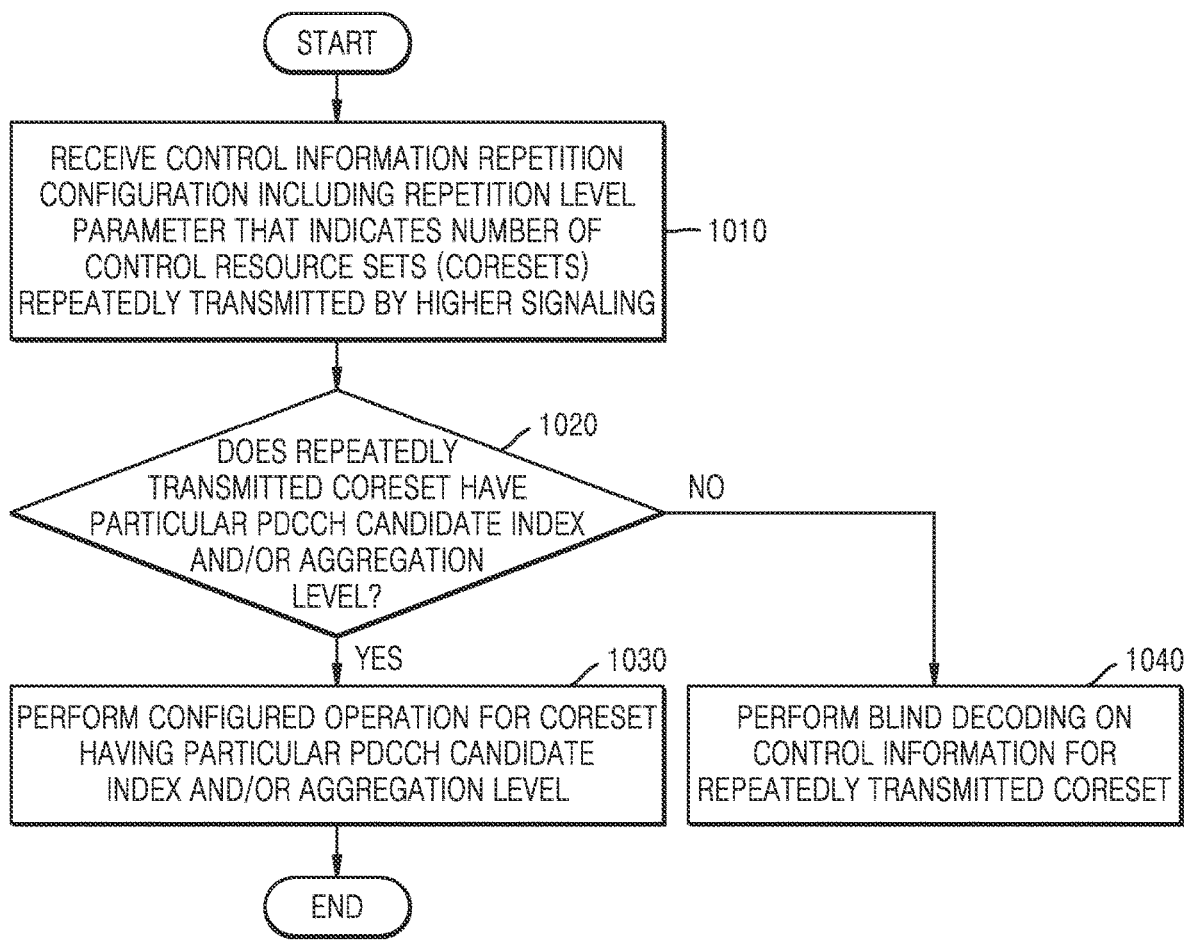
FIG. 10 is a flowchart illustrating a method of repeatedly transmitting control information of a UE, according to another embodiment.

Referring to FIG. 10, in operation 1010, the UE receives a control information repetition configuration including a repetition level parameter that indicates the number of repeatedly transmitted CORESETs through higher layer signaling. In an embodiment, the control information repetition configuration may be included in CORESET configuration information or search space configuration information.

In operation 1020, the UE determines whether a particular PDCCH candidate index and/or an aggregation level is included in a repeatedly transmitted CORESET. In other words, an occasion when repeated CORESETs are configured by higher layer signaling but an actual PDCCH candidate is not transmitted is determined. Specifically, whether there is a PDCCH candidate having a particular AL value and/or a particular PDCCH candidate index may be determined. The reason for determining whether a PDCCH candidate is transmitted or received or the PDCCH candidate is present is that PDCCH candidates, at least some of which overlap with a resource domain preoccupied by a sync signal, system information, or a reserved resource, may not be transmitted in the resource domain.

In operation 1030, when there is a PDCCH candidate having a particular AL value and/or a particular PDCCH candidate index, the UE performs configured operations. For example, the UE may determine that the same DCI has been repeatedly transmitted except for a particular PDCCH candidate that is not transmitted in a particular CORESET or that the same DCI is repeatedly transmitted for PDCCH candidates having other index values or AL values except for the particular PDCCH candidate.

When there is not a PDCCH candidate having the particular AL value and/or the particular PDCCH candidate index in the operation 1020, the UE proceeds to operation 1040 to perform blind decoding on a repeatedly transmitted CORESET.

It is, however, only an embodiment, and various modifications may be made to the embodiment. In an embodiment, blind decoding may be performed on a CORESET including at least one of the same PDCCH candidate index and the same aggregation level, or blind decoding may be performed on a CORESET including at least one of a particular PDCCH candidate index and a particular aggregation level, or blind decoding may not be performed on a CORESET that includes at least one of the particular PDCCH candidate index and the particular aggregation level or that does not include at least one of the particular PDCCH candidate index and the particular aggregation level.

Figure 11:
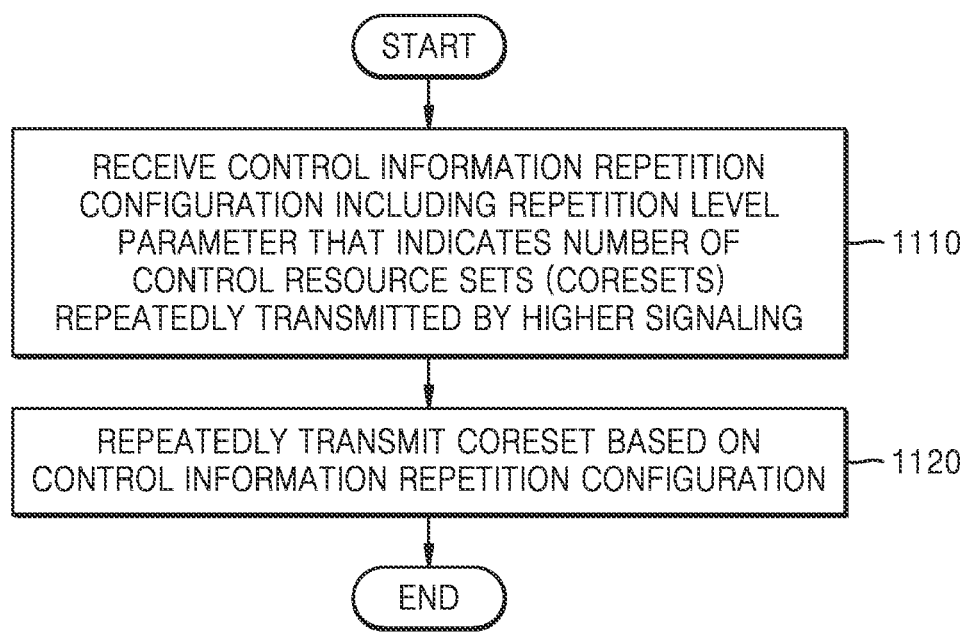
FIG. 11 is a flowchart illustrating a method of repeatedly transmitting control information of a base station (BS), according to an embodiment.

FIG. 11 is a flowchart illustrating a method of repeatedly transmitting control information of a BS, according to an embodiment.

Referring to FIG. 11, in operation 1110, the BS transmits a control information repetition configuration including a repetition level parameter that indicates the number of repeatedly transmitted CORESETs (control resource sets) through higher layer signaling. In an embodiment, the BS may transmit CORESET configuration information or search space configuration information including the repetition level parameter through higher layer signaling. The repetition level parameter may be transmitted in the CORESET configuration information or in the search space configuration information. The aforementioned various configuration information may be included in the CORESET configuration information and the search space configuration information.

Subsequently, in operation 1120, the BS repeatedly transmits CORESETs based on the control information repetition configuration. In an embodiment, the repeatedly transmitted CORESETs include the same DCI information. In other words, the same DCI information is repeatedly transmitted in the CORESETs configured to be repeated.

Figure 12:
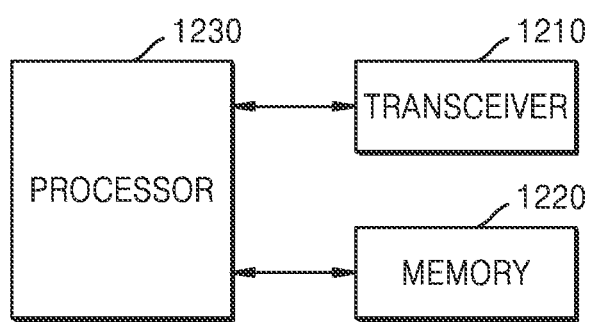
FIG. 12 is a block diagram illustrating an internal structure of a UE, according to an embodiment.

FIG. 12 is a block diagram illustrating an internal structure of a UE, according to an embodiment.

Referring to FIG. 12, a UE may include a transceiver 1210, a memory 1220, and a processor 1230. The transceiver 1210, the memory 1220, and the processor 1230 of the UE may operate according to the aforementioned communication method of the UE. Components of the UE are not, however, limited thereto. For example, the UE may include more or fewer elements than described above. In addition, the transceiver 1210, the memory 1220, and the processor 1230 may be implemented in a single chip.

The transceiver 1210 may transmit or receive signals to or from a BS. The signals may include control information and data. For this, the transceiver 1210 may include an RF transmitter for up-converting the frequency of a signal to be transmitted and amplifying the signal and an RF receiver for low-noise amplifying a received signal and down-converting the frequency of the received signal. It is merely an example of the transceiver 1210, and the elements of the transceiver 1210 are not limited to the RF transmitter and RF receiver.

In addition, the transceiver 1210 may receive a signal on a wireless channel and output the signal to the processor 1230, or transmit a signal output from the processor 1230 on a wireless channel.

The memory 1220 may store a program and data required for operation of the BS. Furthermore, the memory 1220 may store control information or data included in a signal obtained by the UE. The memory 1220 may include a storage medium such as a read only memory (ROM), a random access memory (RAM), a hard disk, a compact disc ROM (CD-ROM), and a digital versatile disc (DVD), or a combination of storage mediums.

The processor 1230 may control a series of processes for the UE to be operated according to the embodiments of the disclosure. In an embodiment, the processor 1230 may be configured to receive a control information repetition configuration including a repetition level parameter that indicates the number of repeatedly transmitted CORESETs (control resource sets) through higher layer signaling, and perform blind decoding on the repeatedly transmitted CORESETs based on the control information repetition configuration.

Figure 13:
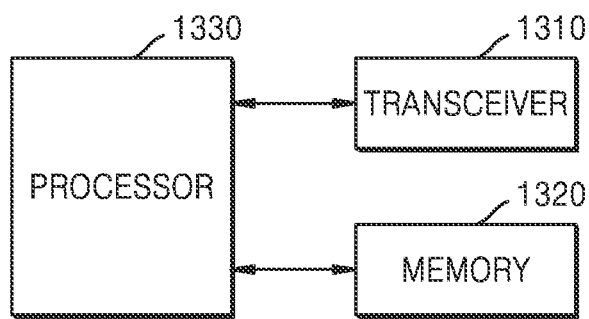
FIG. 13 is a block diagram illustrating an internal structure of a BS, according to an embodiment.

FIG. 13 is a block diagram illustrating a structure of a BS, according to an embodiment.

Referring to FIG. 13, a BS may include a transceiver 1310, a memory 1320, and a processor 1330. The transceiver 1310, the memory 1320, and the processor 1330 of the BS may operate according to the aforementioned communication method of the BS. Components of the BS are not, however, limited thereto. For example, the BS may include more or fewer elements than described above. In addition, the transceiver 1310, the memory 1320, and the processor 1330 may be implemented in a single chip.

The transceiver 1310 may transmit or receive signals to or from a UE. The signals may include control information and data. For this, the transceiver 1310 may include an RF transmitter for up-converting the frequency of a signal to be transmitted and amplifying the signal and an RF receiver for low-noise amplifying a received signal and down-converting the frequency of the received signal. It is merely an example of the transceiver 1310, and the elements of the transceiver 1310 are not limited to the RF transmitter and RF receiver.

In addition, the transceiver 1310 may receive a signal on a wireless channel and output the signal to the processor 1330, or transmit a signal output from the processor 1330 on a wireless channel.

The memory 1320 may store a program and data required for an operation of the BS. Furthermore, the memory 1320 may store control information or data included in a signal obtained by the BS. The memory 1203 may include a storage medium such as a ROM, a RAM, a hard disk, a CD-ROM, and a DVD, or a combination of storage mediums.

The processor 1330 may control a series of processes for the BS to be operated according to the embodiments of the disclosure. In an embodiment, the processor 1330 may be configured to transmit a control information repetition configuration including a repetition level parameter that indicates the number of repeatedly transmitted CORESETs through higher layer signaling, and repeatedly transmit CORESETs based on the control information repetition configuration.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments have been described above, but a person of ordinary skill in the art will understand and appreciate that various modifications can be made without departing the scope of the present disclosure. Thus, it will be apparent to those of ordinary skill in the art that the disclosure is not limited to the embodiments described, which have been provided only for illustrative purposes. Furthermore, the embodiments of the disclosure may be operated by being combined with one another if necessary. For example, an embodiment of the disclosure and some of another embodiment of the disclosure may be combined to operate the base station and the terminal. Although the embodiments of the disclosure are proposed based on a frequency division duplex (FDD) LTE system, modifications to the embodiments of the disclosure, which do not deviate from the scope of the disclosure, may be applicable to other systems such as a time division duplex (TDD) LTE system, a 5G or NR system, or the like.

The invention claimed is:

1. A method performed by a user equipment (UE) in a wireless communication system, the method comprising:
receiving, from a base station, search space configuration information including a parameter related to physical downlink control channel (PDCCH) repetition in a same bandwidth part (BWP);

identifying, based on the search space configuration information, a plurality of search spaces related to the PDCCH repetition; and monitoring a first PDCCH candidate and a second PDCCH candidate in the plurality of search spaces, wherein the first PDCCH candidate and the second PDCCH candidate include same downlink control information (DCI) information, wherein the first PDCCH candidate and the second PDCCH candidate have a same PDCCH candidate index and a same value of aggregation level (AL), and wherein the first PDCCH candidate and the second PDCCH candidate are in a single slot.

2. The method of claim 1, wherein the each of the plurality of search spaces is a resource set for reception of a PDCCH in a control resource set (CORESET).

3. A user equipment (UE) in a wireless communication system, the UE comprising:
 a transceiver; and
 a processor operably coupled to the transceiver, the processor configured to:
  receive, from a base station, search space configuration information including a parameter related to physical downlink control channel (PDCCH) repetition in a same bandwidth part (BWP),
  identify, based on the search space configuration information, a plurality of search spaces related to the PDCCH repetition, and
  monitor a first PDCCH candidate and a second PDCCH candidate in the plurality of search spaces,
 wherein the first PDCCH candidate and the second PDCCH candidate include same downlink control information (DCI) information,
 wherein the first PDCCH candidate and the second PDCCH candidate have a same PDCCH candidate index and a same value of aggregation level (AL), and
 wherein the first PDCCH candidate and the second PDCCH candidate are in a single slot.

4. The UE of claim 3, wherein each of the plurality of search spaces is a resource set for reception of a PDCCH in a control resource set (CORESET).

5. A method, performed by a base station, in a wireless communication system, the method comprising:
 transmitting, to a user equipment (UE), search space configuration information including a parameter related to physical downlink control channel (PDCCH) repetition, wherein the parameter is used to relate a plurality of search spaces to the PDCCH repetition in a same bandwidth part (BWP); and
 transmitting a first PDCCH candidate and a second PDCCH candidate in the plurality of search spaces;
 wherein the first PDCCH candidate and the second PDCCH candidate include same downlink control information (DCI) information
 wherein the first PDCCH candidate and the second PDCCH candidate have a same PDCCH candidate index and a same value of aggregation level (AL), and
 wherein the first PDCCH candidate and the second PDCCH candidate are transmitted in a single slot.

6. A base station; in a wireless communication system, the base station comprising:
 a transceiver; and
 a processor operably coupled to the transceiver, the processor configured to:
  transmit, to a user equipment (UE), search space configuration information including a parameter related to physical downlink control channel (PDCCH) repetition, wherein the parameter is used to relate a plurality of search spaces to the PDCCH repetition in a same bandwidth part (BWP), and
  transmit a first PDCCH candidate and a second PDCCH candidate in the plurality of search spaces,
  wherein the first PDCCH candidate and the second PDCCH candidate include same downlink control information (DCI) information,
 wherein the first PDCCH candidate and the second PDCCH candidate have a same PDCCH candidate index and a same value of aggregation level (AL), and
 wherein the first PDCCH candidate and the second PDCCH candidate are transmitted in a single slot.

* * * * *